T. MIDGLEY.
TIRE FOR VEHICLE WHEELS.
APPLICATION FILED FEB. 10, 1909.
939,611.
Patented Nov. 9, 1909.
3 SHEETS—SHEET 2.
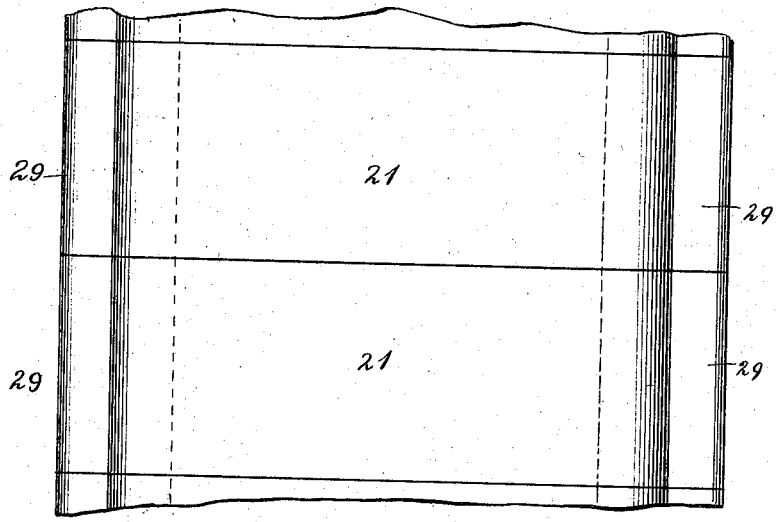
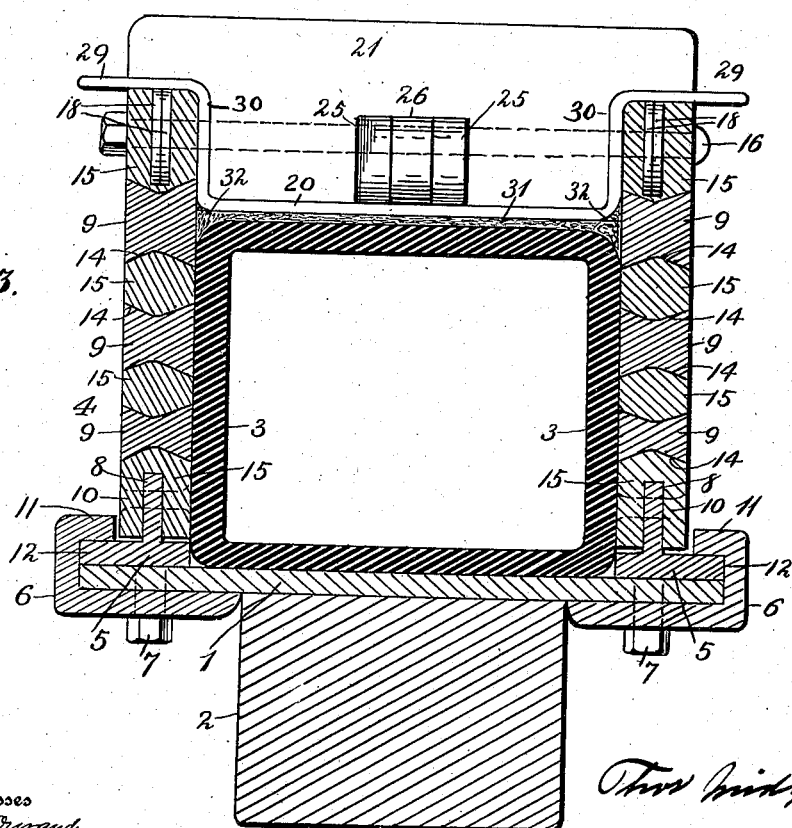

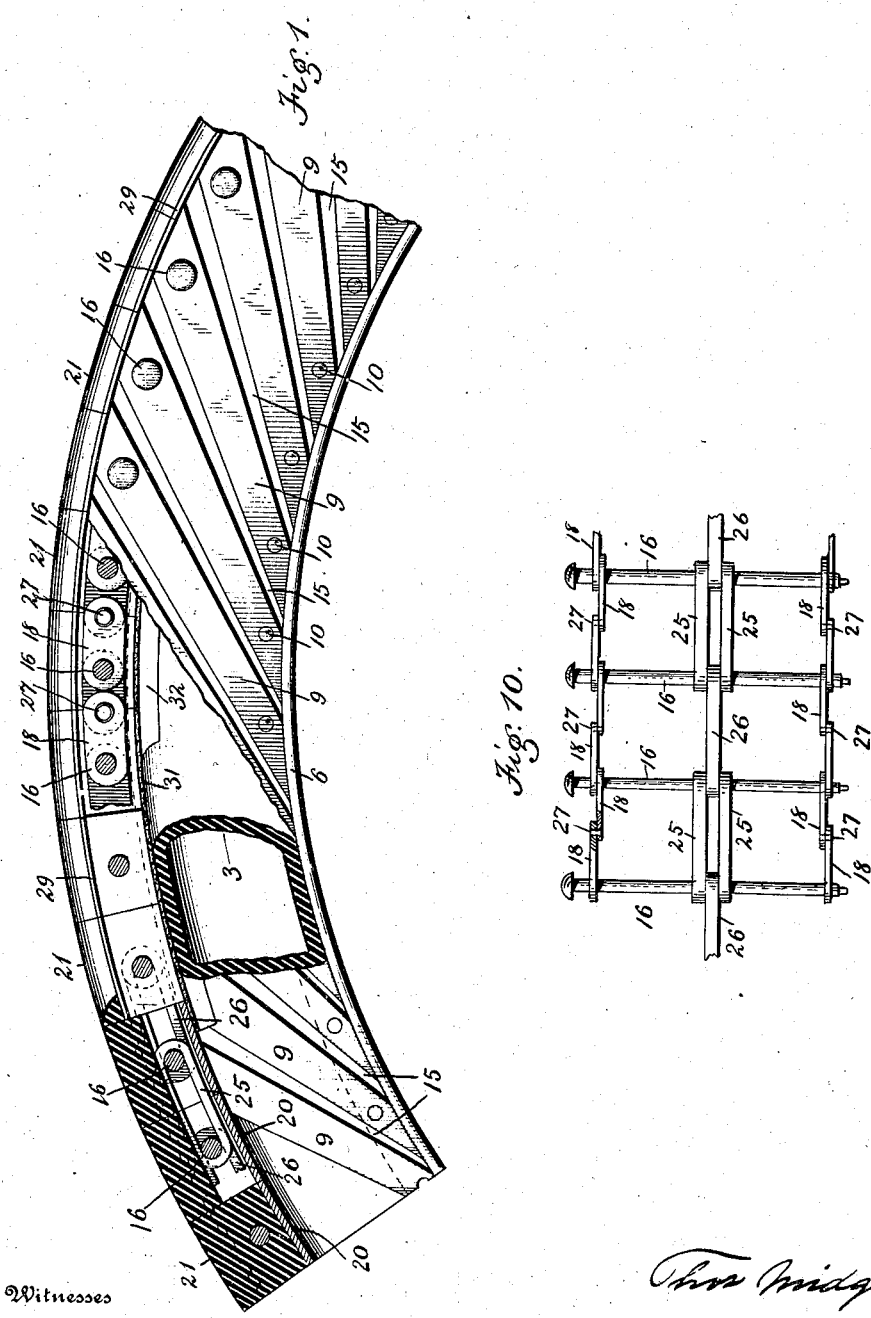

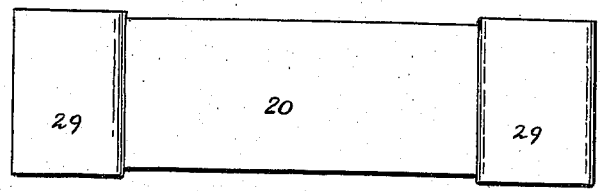
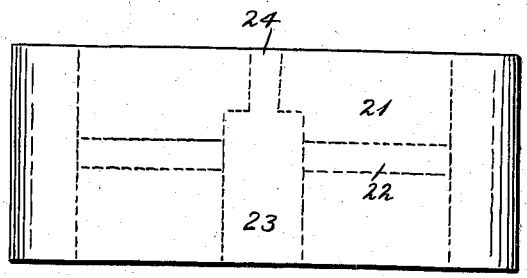
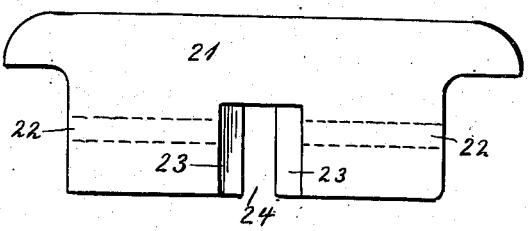
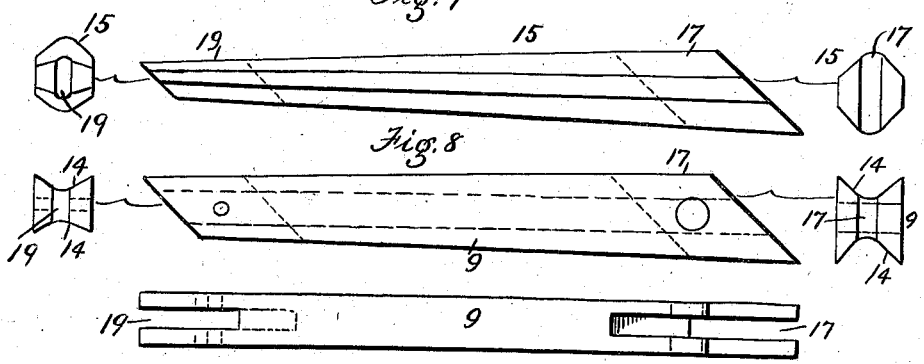

UNITED STATES PATENT OFFICE.

THOMAS MIDGLEY, OF WORTHINGTON, OHIO.

TIRE FOR VEHICLE-WHEELS.

939,611. Specification of Letters Patent. Patented Nov. 9, 1909.

Original application filed November 23, 1908, Serial No. 464,169. Divided and this application filed February 10, 1909. Serial No. 477,040.

*To all whom it may concern:*

Be it known that I, THOMAS MIDGLEY, a citizen of the United States, residing at Worthington, in the county of Franklin and State of Ohio, have invented certain new and useful Improvements in Tires for Vehicle-Wheels; and I do hereby declare the following to be a full, clear, and exact description of the invention, such as will enable others skilled in the art to which it appertains to make and use the same.

My invention relates to tires for vehicle wheels, has especial reference to pneumatic tires designed for use on wagons or trucks for carrying heavy loads, has for its object the construction of tires capable of sustaining great weight and yet being sufficiently resilient to yield to irregularities in or obstructions on a road-bed, and the invention consists in certain improvements in construction, which will be fully disclosed in the following specification and claims.

In the accompanying drawings, which form part of this specification:—Figure 1 represents a side elevation partly in section of a tire embodying my invention. Fig. 2 is a plan view, on an enlarged scale. Fig. 3 is a transverse section, partly in elevation. Fig. 4 is a plan view of one of the tread-carriers detached. Fig. 5 is a plan view of one of the tread-members detached. Fig. 6 is an end view of the same. Fig. 7 is a detail of one of the resilient members forming the sides of the casing. Fig. 8 is a like view of one of the metallic members forming the sides of the casing. Fig. 9 is an edge view of the same. Fig. 10 is a detail plan view showing the links and their connections.

Reference being had to the drawings and the designating characters thereon, the numeral 1 indicates the metallic rim, 2 the felly of a vehicle wheel, 3 the inflatable or pneumatic inner tube, 4 the tire casing, 5 the metallic tire bands forming the base or seat of the composite sides of the casing, and 6 the metallic clamping-rings for securing the tire as a whole to the vehicle wheel by means of bolts 7, or in any preferred manner. The bands 5 are made of metal and are provided with a rib 8 to which the metallic members 9 of the sides of the casing are secured by rivets or bolts 10 or the like, and the flange 11 of the clamping ring 6 engages the outer side 12 of the base of the band 5, as shown in Fig. 3.

The sides of the casing 4, are composed of tapering metallic members 9 arranged at an angle to the tread of the tire, and are provided with longitudinal grooves 14, on their edges; and interposed between said members are like tapering resilient members 15 of rubber, whose edges conform to and engage the grooves 14 in the members 9, thus interlocking said members, as shown in Figs. 1 and 3. The upper ends of the members 9 are engaged by transverse bolts 16, and the members 9 and 15 are provided with a slot 17 at their upper ends to receive metallic links 18, and with a slot 19 at their lower ends to receive the ribs 8 on the bands 5.

20 indicates detachable sectional metallic tread-carriers or supports preferably made of sheet steel stamped into form, on which sectional tread-members 21 of rubber or other resilient material are supported and are separately removable and renewable as the tire wears, without providing an entire new tread for the wheel.

Each member 21 is provided with a transverse opening 22 to receive one of the bolts 16, and with slots 23 and 24, the former to receive links 25, which are also engaged by the bolts 16, and the latter slot 24, to receive the link 26 placed between each pair of links 25, 25, which link 26 is engaged by adjacent bolts 16. Each link 18 is engaged at one end by the bolts 16 and is connected to the adjacent link at its opposite end by a rivet 27, as shown in Figs. 1 and 10. The links are under the tread-members 21, extend throughout the circumference of the casing, one set of the links 18 on each side, and one set of the links 25, 25 and 26 in the transverse center of the casing.

The tread-carriers 20 are provided with laterally extending flanges 29 which project out sufficiently to cover the heads and the nuts of the bolts 16, as shown in Fig. 3 and are engaged by the bolts 16 which extend through the walls 30, thereof.

The links 25, 25 and 26, and the links 18, and the transverse bolts 16, take the strain on the periphery of the tire and contribute materially to the strength thereof, while the sectional tread-members 21 take the surface wear of the tire, and are separately renewable as required.

The composite sides of the tire-casing are sufficiently resilient to accommodate the flexure of the sides and yet are of such strength as to sustain the weight generally carried by trucks or other vehicles for transporting heavy loads.

31 indicates a lining of fabric or like material provided with corner filling pieces 32 cemented or vulcanized thereon, and interposed between the periphery of the inner tube 3 and the inner surface of the tread-carriers 20 to protect the inner tube from wear and allow said tube to assume a rounded form on each side under the filling pieces 32.

It is obvious that changes may be made in the details of construction of the several parts without departing from the spirit of my invention.

The primary features of my invention are claimed in my application, Serial No. 464,169, of which this application is a division.

Having thus fully described my invention, what I claim is—

1. A tire for vehicles provided with a casing having composite sides of separate members, part of which are resilient, tread-carriers, tread-sections on said carriers, links extending throughout the circumference of the casing, and transverse bolts engaging said sides, tread-carriers and links.

2. A tire for vehicles provided with a casing having separate sides composed of alternate flexible and inflexible members, tread-carriers interposed between and covering the periphery of said sides, a separate tread, reinforcing links below the surface of the tread, and transverse bolts engaging the inflexible members of the sides, the tread-carriers, the links and the tread.

3. A tire for vehicles provided with a casing having separate sides, a separate tread, reinforcing metallic links on each side of the casing and between the sides, and transverse bolts engaging said sides, links and tread.

4. A tire for vehicles provided with a casing composed of separate detachable sides, a separate detachable tread, transverse bolts engaging said sides and tread, an inflatable inner tube, and an interposed lining between said tube and tread.

5. A tire for vehicles provided with a casing composed of separate sides of alternate flexible and inflexible members, base-plates for engaging the rim of a wheel, and to which said sides are secured, a separate tread, reinforcing metallic links engaging said sides and said tread below the surface of the tread, and transverse bolts engaging said sides, links and tread.

In testimony whereof I affix my signature, in presence of two witnesses.

THOMAS MIDGLEY.

Witnesses:
CHARLES L. M. TRUMM,
MARGUERITE IMMEL.